United States Patent [19]

Durand

[11] 4,166,885
[45] Sep. 4, 1979

[54] PROCESS FOR THE PRODUCTION OF ELECTRIC CURRENT IN AN ELECTROCHEMICAL GENERATOR HAVING AN ANODIC ELECTRON COLLECTOR COMPRISING A PASSIVATING LAYER

[75] Inventor: Pierre Durand, Clermont-Ferrand, France

[73] Assignee: Compagnie Generale des Etablissements Michelin, Clermont-Ferrand, France

[21] Appl. No.: 873,367

[22] Filed: Jan. 30, 1978

[30] Foreign Application Priority Data

Jan. 31, 1977 [FR] France .............................. 77 03092

[51] Int. Cl.² .......................................... H01M 8/04
[52] U.S. Cl. ....................................... 429/15; 429/17; 429/27
[58] Field of Search .................... 429/15, 17, 27, 34, 429/13, 12, 14, 19, 101

[56] References Cited

U.S. PATENT DOCUMENTS

| | | | |
|---|---|---|---|
| 3,316,126 | 4/1967 | Leduc | 429/34 |
| 3,849,202 | 11/1974 | Pompon | 429/13 X |
| 3,887,400 | 6/1975 | Doniot et al. | 429/15 |

Primary Examiner—Anthony Skapars
Attorney, Agent, or Firm—Brumbaugh, Graves, Donohue & Raymond

[57] ABSTRACT

A process for the production of electric current using an electrochemical generator having a cell with an anode compartment containing, during the production of electric current, a moving primary aqueous electrolyte containing particles formed, at least in part, of an active metallic material capable of being oxidized with the loss of the electrons collected by an anodic electron collector is improved in the following manner: during the production of electric current substantially the entire surface of the anodic electron collector arranged on the primary electrolyte side is formed of a metallic material which is in passivated state; prior to the production of electric current, this surface is placed in contact with a secondary aqueous electrolyte, said surface being then brought to a potential less than the equilibrium potential of the electrochemical reaction of the reduction of the water contained in said secondary electrolyte, said reduction reaction liberating hydrogen.

23 Claims, 4 Drawing Figures

PROCESS FOR THE PRODUCTION OF ELECTRIC CURRENT IN AN ELECTROCHEMICAL GENERATOR HAVING AN ANODIC ELECTRON COLLECTOR COMPRISING A PASSIVATING LAYER

This invention relates to generators of electric current comprising at least one cell having at least one anode compartment and at least one cathode compartment, within which compartments electrochemical reactions are carried out.

The invention also relates to the processes employed in these electrochemical generators.

In particular, the invention concerns generators in which the active material of the anode compartment, at times referred to as fuel, is a metallic material which, during the discharge of the generator, that is to say during the production of electric current, is oxidized electrochemically, losing electrons collected by at least one electrically conductive member, known as the anodic electron collector.

In my U.S. applications Ser. Nos. 707,778, filed July 22, 1976, now abandoned, and 831,437, filed Sept. 8, 1977, there is described an electrochemical generator of this type comprising at least one anode compartment within which there is contained a moving aqueous electrolyte containing particles formed, at least in part, of an active metallic material, said generator being characterized by the fact that substantially all of the surface of the anodic electron collector which is arranged on the electrolyte side is formed of a metallic material which is in passivated state. The expression "passivated state" means that the metallic material of the surface of the anodic electron collector is covered with a layer comprising one or more inorganic compounds of at least one metal constituting all or part of said metallic material, which layer may, for instance, be formed when the anodic electron collector is in contact with atmospheric air or electrolyte. These inorganic compounds may, for instance, be salts, oxides, or hydroxides. The metallic materials which can give rise to such passivation phenomena are in particular magnesium, the metals of Groups 3b, 4b, 5b, 6b, of the periodic classification of elements (Handbook of Chemistry and Physics, 53rd edition, 1972–1973, published by the Chemical Rubber Company, Cleveland, Ohio) and more particularly scandium, yttrium, lanthanum, titanium, zirconium, hafnium, niobium, tantalum, and chromium, or certain of their alloys with each other or with other metals, in particular austenitic stainless steels comprising at least iron, nickel and chromium, said steels being thermodynamically stable at the temperatures of use of the generator and containing at most 0.02% by weight of carbon.

The presence of this passivating layer avoids the fixing and agglomerating of the active particles on the surface of the anodic electron collector. This phenomenon appears to be due to a modification of the electrochemical behavior of the combination formed of the surface of the anodic electron collector, the electrolyte, and the active particles.

In accordance with my U.S. applications Ser. Nos. 821,759, now U.S. Pat. No. 4,101,717, 821,760 now U.S. Pat No. 4,092,461 and 821,761, all filed Aug. 4, 1977, the active particles may possibly form, within the anode compartment, a sedimentation bed contiguous to the lower face of the inside of the anode compartment, said lower face being formed, at least in part, by all or part of that surface of the anodic electron collector which is arranged on the electrolyte side.

However, even if the passivating layer is of small thickness, for example, on the order of a few tens of Angstroms, it may cause a loss of power of the generator as a result of its high electrical resistance. This is true in particular when the generator remains without supplying electric current for a relatively long period of time, for instance, several hours, the anodic electron collector being no longer in contact with the particles. The resistance of the passivating layer then frequently increases.

The object of the present invention is to avoid these drawbacks.

Accordingly, the process for the production of electric current, in accordance with the invention, using an electrochemical generator comprising at least one cell with at least one anode compartment in which there is present, during the production of electric current, an aqueous electrolyte in movement, called primary electrolyte, containing particles formed, at least in part, of an active metallic material, called active particles, said active metallic material being capable of being oxidized electrochemically in the anode compartment with the loss of the electrons collected by at least one anodic electron collector, is characterized by the fact that during the production of electric current substantially the entire surface of the anodic electron collector arranged on the primary electrolyte side is formed of a metallic material which is in passivated state, and by the fact that, prior to the production of electric current, said surface is placed in contact with an aqueous electrolyte, called secondary electrolyte, said surface being then brought to a potential less than the equilibrium potential $V_a$ of the electrochemical reaction of the reduction of the water contained in said secondary electrolyte, said reduction reaction liberating hydrogen.

The invention also concerns electrochemical generators in which this process is carried out.

The invention will be readily understood with the aid of the following nonlimitative example and figures of the drawing.

Figure 1:
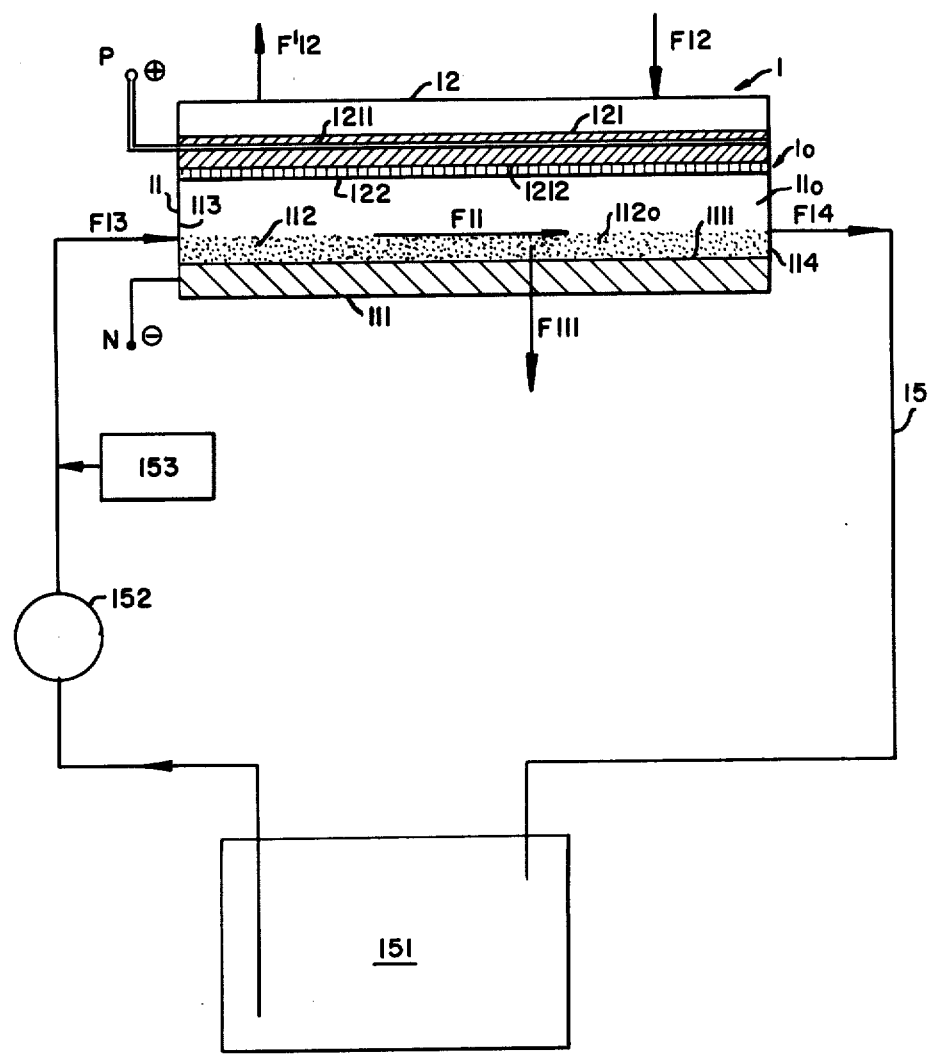
FIG. 1 shows schematically, in section, a generator of the metal-air type whose anode compartment comprises an anodic electron collector and which contains, during the production of electric current, active particles within a primary electrolyte, the process in accordance with the invention being capable of being carried out in this generator.
Figure 3:
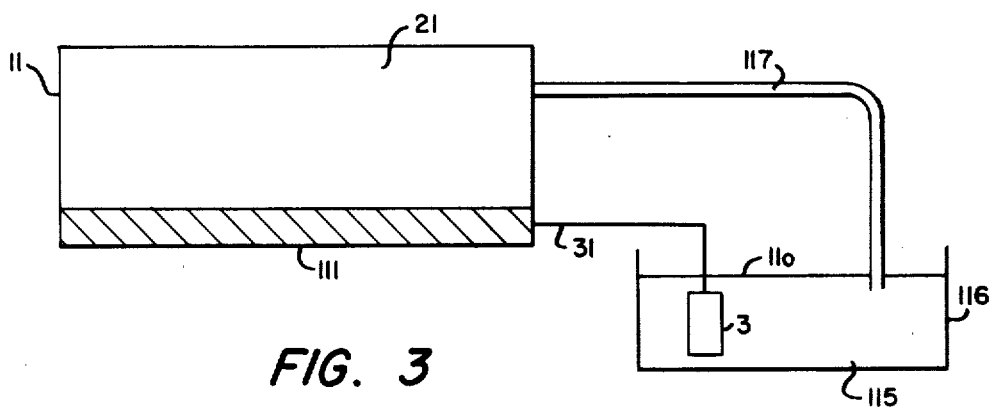
Figure 4:
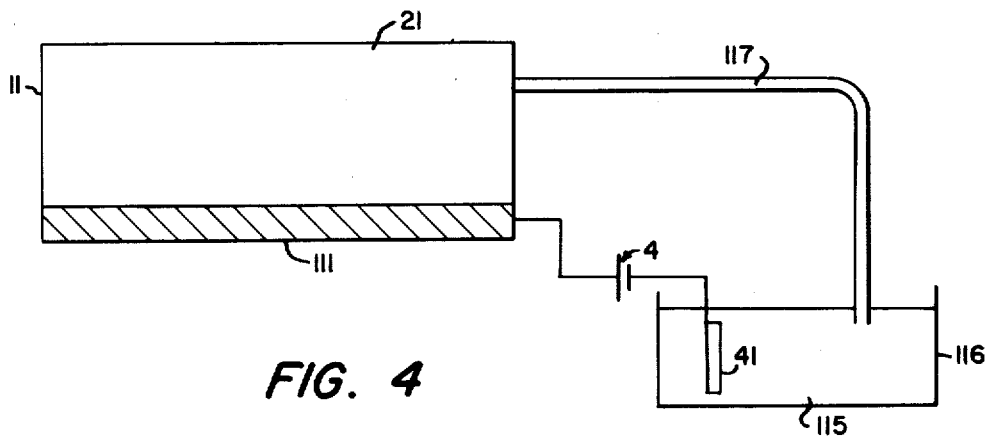

FIG. 3 shows schematically, in section, the anode compartment of the generator shown in FIG. 1, the anodic electron collector, which is in contact with a secondary electrolyte, being connected electrically to a part immersed in an electrolyte, in accordance with another embodiment of the invention; and FIG. 4 shows schematically, in section, the anode compartment of the generator shown in FIG. 1, the anodic electron collector being in contact with a secondary electrolyte, and a device of the generator making it possible to bring the surface of the anodic electron collector to the above-mentioned potential in accordance with the invention.

An electrochemical generator 1 of the metal-air type is shown schematically, in section, in FIG. 1. This generator 1 comprises a cell 10 having an anode compartment 11 and a cathode compartment 12. The cathode compartment 12 has a cathode 121 which is, for instance, an air or oxygen diffusion electrode, the active material being oxygen. Another type of cathode could be used in which the active material would, for instance, be at least one compound of oxygen, in particular a metal oxide. The entrance of gas into the cathode compartment 12 and the discharge thereof from said compartment 12 are represented by the arrows F12 and F'12, respectively. The collector 1211 of said cathode 121 is connected to the positive terminal P of the cell 10, said collector 1211 serving to deliver to the cathode 121 the electrons which are necessary for the electrochemical reduction of the oxygen. The anodic electron collector 111, connected to the negative terminal N of the cell 10, is arranged facing the cathode 121, said anodic electron collector 111 having, for instance, the shape of a substantially flat and horizontal sheet which is impermeable to the primary electrolyte 110 and to the active particles 112 contained therein. The primary electrolyte 110 containing active particles 112 flows in the anode compartment 11 between the cathode 121 and the anodic electron collector 111, the average direction of this flow being represented by the arrow F11 which is located substantially in the plane of FIG. 1. The active particles 112 constitute within the anode compartment 11 a sedimentation bed 1120 which is entrained by the primary electrolyte 110 in the direction indicated by the arrow F11, this sedimentation bed 1120 being contiguous to the surface 1111 of the anodic electron collector 111, said surface, arranged on the electrolyte side, constituting the lower face of the inside of the anode compartment 11. The movements of the active particles 112 within the sedimentation bed 1120 make it possible to obtain a high current density, facilitating the diffusion phenomena. If electronic short circuits are feared between the cathode 121 and the active particles 112, a porous membrane 122 which is permeable to the electrolyte 110 and impermeable to the active particles 112 can be applied to the face 1212 of the cathode 121, said face 1212 being arranged on the electrolyte side. The feed device, indicated schematically by the arrow F13, makes it possible to introduce the electrolyte 110 and the active particles 112 into the inlet 113 of the anode compartment 11. This feed device F13 can, for instance, be one of the feed devices described in my aforementioned U.S. application Ser. No. 821,759, these devices making it possible to cause a divergence of the streamlines of the flow. The evacuation device schematically indicated by the arrow F14 makes it possible to evacuate from the outlet 114 of the anode compartment 11 the primary electrolyte 110 and the active particles 112 which have not been entirely consumed during their passage through the anode compartment 11, which evacuation device F14 may, for instance, be one of the evacuation devices described in my aforementioned U.S. application Ser. No. 821,759, these devices making it possible to bring about a convergence of the streamlines of the flow. The evacuation device F14 is connected to the feed device F13 by an outer path 15 comprising a pump 152 permitting the recycling of the primary electrolyte 110 and of the particles 112 into the anode compartment 11 and an electrolyte and particle buffer tank 151. A device 153 which leads into the path 15 makes it possible to maintain the percentage by weight of active particles 112 in the electrolyte 110 constant.

The operating conditions may, for instance, be the following:

- active particles 112: zinc particles of an average diameter, before introduction into the primary electrolyte 110, which ranges from 10 to 20 microns,
- primary electrolyte 110: aqueous 4 to 12 N potassium hydroxide (4 to 12 mols of KOH per liter),
- percentage by weight of zinc particles in the circulating primary electrolyte 110: 10–30%,
- temperature of the primary electrolyte 110 and of the generator 1: substantially equal to ambient temperature, namely on the order of 25° C.,
- average velocity of the flow in the anode compartment 11, that is to say the ratio between, on the one hand, the total volumetric flow of the active particles 112 and of the primary electrolyte 110 and, on the other hand, the average cross section of the flow vein, said average section being measured substantially at the center of the anode compartment 11, perpendicular to the average direction of flow directed along the arrow F11: 10 to 30 m/minute.

The sedimentation of the active particles 112 in the vicinity of the anodic electron collector 111 is obtained, despite the initial fineness of these active particles, since they combine with each other in contact with the basic electrolyte 110 to form larger particles whose average diameter is in general at least equal to 50 microns. The concentration of oxidized zinc dissolved in the form of potassium zincate in the primary electrolyte 110 is maintained below a predetermined value, equal for instance to 120 g/L approximately, when the primary electrolyte 110 is 6 N potassium hydroxide, so that the zinc particles are not made inactive by an accumulation of the oxidation product at their surface or in the vicinity of their surface. This result may be obtained either by replacing the zincated electrolyte 110 by a fresh solution of potassium hydroxide which is free of zincate when its concentration is dissolved zinc becomes excessive, or by continuously regenerating the zincated electrolyte 110 in an installation, not shown in FIG. 1. The anodic electron collector 111 is, for instance, formed of a sheet of copper or brass of low electrical resistance covered with an electrolytic deposit of chromium on that surface 1111 thereof which is intended to be in contact with the electrolyte in the anode compartment 11.

The surface 1111 is washed with a dilute solution of sulfuric acid so as to eliminate any passivating layer from said chromium surface. This surface is then rinsed with water or with an aqueous solution of potassium hydroxide and the anodic electron collector 111 is placed in the cell 10. The primary electrolyte 110 and the active particles 112 are then caused to circulate in the anode compartment 11, the devices F13 and F14 and the outer path 15, causing the generator 1 to discharge into an electric circuit (not shown) which is arranged between the terminals P and N, the current delivered being equal, for instance, to 150 mA per $cm^2$ of the surface 1212 of the air electrode 121, the voltage being close to 1 volt. As a result of the passivation of the chromium in contact with the atmospheric air or the electrolyte, substantially all of the surface 1111 in contact with the primary electrolyte 110 is then formed of a fresh passivating layer formed primarily of chromium oxides of a greater or lesser degree of hydration.

Due to this passivating layer, the generator 1 can operate continuously without attachment or agglomeration of the zinc particles on the surface 1111 of the anodic electron collector 111, the power delivered by the generator 1 being on the order of 50 watts. This result cannot be obtained by replacing the passivated metal of the anodic electron collector 111 by a nonpassivated metal, for instance copper, cadmium, nickel, iron, platinum, rhodium, gold, silver, lead or by a metallic material presenting an interruption of passivation, such as an austenitic stainless steel known as AFNOR Z 6 CN 18-09 (about 0.07% carbon, 17% to 19% chromium, 8% to 10% nickel) or as a ferritic stainless steel of the type ORION 26-1 produced by the Societe Creusot-Loire (about 0.002% carbon, 26% chromium, 1% molybdenum). In fact, the circulation of the primary electrolyte 110 and the active particles 112 then becomes rapidly impossible as a result of clogging of the anode compartment 11, the voltage of the generator 1, on the other hand, decreasing rapidly and becoming practically zero as a result of the accelerated passivation of the agglomerated particles.

The circulation of the primary electrolyte 110 and of the active particles 112 is then stopped, as well as the discharge of the generator 1 with passivated anodic electron collector 111.

The anode compartment 11 is emptied, left in contact with the ambient air or filled with a solution of zincated or nonzincated potassium hydroxide solution which is free of particles of zinc. After this interruption of operation, known as the quiescent period, which has lasted for instance about 6 hours, a new discharge of the generator 1 is effected by again circulating the primary electrolyte 110 and the active particles 112. As previously, the circulation takes place without attachment or agglomeration of the active particles 112 on the surface 1111 of the anodic electron collector 111 due to the passivating layer; on the other hand, the power delivered by the generator 1 is definitely less than 50 W, for instance one quarter of this value, and this whatever the time during which said second discharge is effected.

This loss of power comes from an excessive increase in the electrical resistance of the passivating layer during the period of nonoperation of the generator 1.

Figure 2:
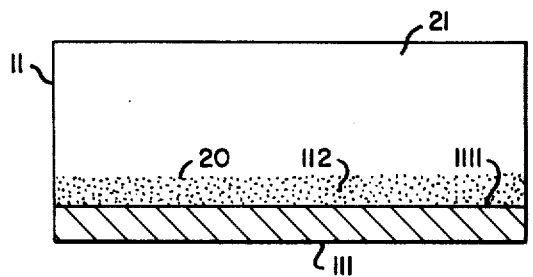
FIG. 2 shows schematically, in section, the anode compartment of the generator shown in FIG. 1, an immovable carpet of sedimented particles in a secondary electrolyte covering the anodic electron collector in accordance with one embodiment of the invention.

This drawback is avoided if, prior to the production of electric current upon the second discharge, the surface 1111 of the anodic electron collector 111 is in contact with a secondary aqueous electrolyte, said surface 1111 being then brought to a potential less than the equilibrium potential $V_a$ of the electrochemical reaction of the reduction of the water contained in this secondary electrolyte. This can be obtained, for instance, by four different methods:

(1) by leaving in contact with the surface 1111, for substantially the entire quiescent period, a carpet 20 of zinc particles 112 sedimented in the alkaline secondary electrolyte 21 which fills the anode compartment 11, said secondary electrolyte 21 and the zinc particles 112 being immovable (FIG. 2);

(2) or by circulating the alkaline secondary electrolyte 21 containing zinc particles 112 along the anodic electron collector 111, the zinc particles 112 then constituting a sedimentation bed similar to the bed 1120 shown in FIG. 1, entrained by the secondary electrolyte 21, this for substantially the entire quiescent period or for a period of time preceding the second discharge varying from about 5 minutes to one hour;

(3) or, during substantially the entire quiescent period, placing the anodic electron collector 111 in electrical contact, by at least one electron-conducting conductor 31 with at least one part 3 at least one portion of which is metallic, said metallic portion which is electrically connected with the anodic electron collector 111 being of zinc or in contact with zinc; this part 3, and possibly the zinc with which it is in contact, are immersed in an alkaline electrolyte 115 placed in a receptacle 116 outside the cell 10, said electrolyte 115, known as the coupling electrolyte, being in ionic coupling via the conduit 117 with the secondary electrolyte 21, which is for instance alkaline and fills the anode compartment 11, the electrolytes 21 and 115 being possibly identical (FIG. 3);

(4) or by imposing this potential on the anodic electron collector 111 for substantially the entire quiescent period by means of at least one device 4 of the generator 1; this device 4, which makes it possible to supply an electric voltage, being, for instance, a potentiostat, outside the cell 10; it is then connected electrically, on the one hand, to the anodic electron collector 111 and, on the other hand, to the counter electrode 41 which is in ionic coupling with the secondary electrolyte 21, which is for instance alkaline, and fills the anode compartment 11, for instance, by means of the coupling electrolyte 115 arranged in the receptacle 116 and in contact with the counter electrode 41 and the conduit 117 which are shown in FIG. 3 (FIG. 4).

The secondary electrolyte 21 may, for instance, consist of zincated or nonzincated potassium hydroxide. This secondary electrolyte 21 may possibly be formed of the primary electrolyte 110 itself. Thus, for instance, for the carrying out of the process (1), the flow of the primary electrolyte 110 and of the zinc particles 112 can be stopped, the zinc particles 112 then precipitating in the primary electrolyte 110 so as to constitute the carpet 20 shown in FIG. 2. For the carrying out of the process (2) one can also possibly continue the circulation of the primary electrolyte 110 and of the zinc particles 112 during the quiescent period.

Upon the second discharge, which immediately follows the placing in operation of the processes described above, the power delivered by the generator 1 is then substantially the same as prior to the quiescent period, that is to say the electrical resistance of the passivating layer is substantially the same at the end of the first discharge as at the start of the second discharge, this electrical resistance being considered in the direction of the thickness of the passivating layer, that is to say in the direction of the arrow F111 oriented perpendicular to said surface 1111 (FIG. 1). The powers obtained during these two discharges may then be practically identical to those obtained in the generator 1 with a nonpassivated anodic electron collector 111, for instance an anodic electron collector 111 made entirely of copper, before attachment of the zinc particles 112 to this nonpassivated collector 111, the other operating conditions being the same. In fact, for an intensity of 150 mA/cm$^2$ of the face 1212 of the cathode 121, the ohmic drop due to the passivating layer is then at most equal to 30 mV, which corresponds to a surface resistance at most equal to 0.2 Ω cm$^2$ for the surface 1111 of the anodic electron collector 111, since the face 1212 and the surface 1111 have practically the same area.

The explanation of the beneficial effect due to the processes in accordance with the invention which have been described above is probably the following:

The equilibrium potential $V_a$ of the electrochemical reaction of the reduction of the water contained in the secondary electrolyte 21 is the potential at which the following opposite electrochemical reactions (1) and (2) are in equilibrium in said electrolyte:

$$H_2O + 1\,e \underset{(2)}{\overset{(1)}{\rightleftarrows}} \tfrac{1}{2} H_2 + OH^-$$

in other words, the liberation of hydrogen by reaction (1) for the reduction of the water contained in this secondary electrolyte 21 is possible only at potentials below this equilibrium potential $V_a$.

The equilibrium potential $V_b$ of zinc in contact with zincate ions in an alkaline electrolyte, which is the case of the zinc in contact with one of the alkaline electrolytes 110, 21, 115, whether or not these electrolytes are zincated before their contact with the zinc, is the potential at which the following opposite electrochemical reactions (3) and (4) are at equilibrium in said electrolyte:

$$Zn(OH)_4^{--} + 2\,e \underset{(4)}{\overset{(3)}{\rightleftarrows}} Zn + 4\,OH^-$$

Whatever the measurement conditions, the equilibrium potential $V_a$, corresponding to the equilibrium of the reactions (1) and (2), is always greater than the potential $V_b$, corresponding to the equilibrium of reactions (3) and (4). For example, with a 6N aqueous solution of potassium hydroxide (6 mols of KOH per liter) containing 65 grams per liter of the zinc dissolved in the form of potassium zincate, the equilibrium potentials $V_a$ and $V_b$ in this electrolyte are $-0.87$ V and $-1.28$ V, respectively, at ambient temperature, namely substantially 25° C., these potentials being determined with reference to the potential of the standard hydrogen electrode. These measured values are in agreement with the values calculated in accordance with the data of the book "Atlas d'équilibres électrochimiques" by Marcel Pourbaix, publisher Gauthiers-Villars et Cie, Paris, 1963. The potential to which the anodic electron collector is brought in processes (1), (2), and (3) previously described is very close to the equilibrium potential $V_b$ of the zinc with which it is in contact either directly as in processes (1) and (2) or via an electrical conductor as in process (3). Therefore, in processes (1), (2), (3), and (4) which have been described above, the anodic electron collector 111 is brought to a potential below the equilibrium potential $V_a$ of the electrochemical reaction of the reduction of the water contained in the secondary electrolyte 21 with which it is in contact, the potential of the anodic electron collector 111 being possibly in process (4) lower or greater than the potentials to which this collector is brought in processes (1), (2), and (3). The fact that the anodic electron collector 111 and, therefore, the surface 1111 are brought to a potential less than the equilibrium potential $V_a$ of the electrochemical reaction of the reduction of the water permits the liberation of hydrogen in accordance with reaction (1) and the penetration of hydrogen atoms into the chromium oxide lattices.

These hydrogen atoms then behave as electron-donor impurities, this doping of the passivating layer thus making it possible to decrease the electrical resistance thereof. The fresh passivation layer obtained in the preceding example has a low electrical resistance because it is formed, at least in part, by reduction of the water, for instance in accordance with the chemical reaction $$Cr + 3H_2O \rightarrow Cr(OH)_3 + (3/2)H_2 \qquad (5)$$

when the nonpassivated surface of the chromium is placed in contact with the water or the aqueous potassium hydroxide, the anodic electron collector then assuming by itself during this reaction a potential below the equilibrium potential $V_a$. On the other hand, when the anodic electron collector 111 comprising this conductive passivating layer remains in contact with the air for a rather long period of time a substantial increase is noted in the electrical resistance of this layer as a result of the disappearance of the hydrogen initially present in said layer. The substantial increase in the resistance of said layer when the collector remains for a rather long time in contact with the alkaline electrolyte whether zincated or not, which is free of zinc particles, is due to the fact that the potential of the collector is no longer sufficiently negative with respect to the potential of the standard hydrogen electrode to permit the electrochemical reduction of the water to hydrogen and the hydrogen initially present in the layer gradually disappears by oxidation or diffusion into the electrolyte.

The passivating layer which covers the chromium is not destroyed at the potential $V_b$ corresponding to the equilibrium reactions (3) and (4) nor at the potential to which the collector 111 is brought in processes (1), (2) and (3), since the chromium oxides are reduced at potentials substantially less than this equilibrium potential $V_b$. By way of example, if the passivating layer is formed of chromium hydroxide $Cr(OH)_3$, the reduction of this hydroxide in accordance with the electrochemical reaction $$Cr(OH)_3 + 3H^+ + 3e \rightarrow Cr + 3H_2O \qquad (6)$$

can take place only at a potential below $-1.51$ V with respect to the potential of the standard hydrogen electrode when this passivating layer is in contact with 6 N potassium hydroxide at 25° C.

It should be pointed out, however, that the passivating layer can possibly be caused to disappear prior to the second discharge of the generator 1 by bringing the anodic electron collector 111, by means of the device 4 of process (4), to a potential which is sufficiently negative with respect to the potential of the standard hydrogen electrode so that not only the electrochemical reduction of water is possible but that, furthermore, the passivating layer is destroyed by electrochemical reduction, this potential being then less than the equilibrium potentials $V_a$ and $V_b$. The passivating layer is then reformed in contact with the electrolyte just before the second discharge of the generator 1 when the device 4 is no longer connected to the anodic electron collector 111, said new passivating layer being conductive for the reasons previously mentioned.

When the surface 1111 is formed of metallic materials other than chromium, these metallic materials being passivated in the presence of air or alkaline electrolyte, such as for instance titanium, niobium, hafnium, or tantalum or a stainless steel known as AFNOR Z 1NCDU 25-20-4-2 (at most 0.02% carbon, about 24% to 27% nickel, 19% to 22% chromium, less than 2% manganese, 4% to 4.8% molybdenum, 1% to 2% copper), this austenitic steel being thermodynamically stable at the temperatures of use of the generator 1, one notes phenomena similar to those which have been described above in the case of the surface 1111 formed of chromium, the other operating conditions not being changed.

Of course, the invention is not limited to the embodiment which has been described above, on basis of which one can contemplate other methods and forms of embodiments without thereby going beyond the scope of the invention.

Accordingly, the invention extends, for instance, to generators connected to devices for the recirculation of the electrolyte and particles which have devices for the treatment of the electrolyte and/or particles, in particular electrolytic or chemical regeneration devices, for instance devices for the feeding of metals which are more electronegative than the anode active materials. It also covers, by way of example, the cases in which the anodic electron collector is permeable to the electrolyte, particularly when it is made of a perforated plate or a grid which is separated from the cathode compartment or applied against the cathode compartment, a membrane which is permeable to the electrolyte and impermeable to the particles being possibly arranged between said plate or grid and the cathode compartment, particularly if the average diameter of the particles is less than the dimensions of the openings of the anodic electron collector.

Is is furthermore obvious that the invention applies whatever the arrangement of the cells—in series, in parallel or in parallel-series—when the generator comprises a plurality of cells in accordance with the invention.

The invention also applies whatever the number of anode or cathode compartments in each cell, and whatever the number of collectors, inlets and outlets, in each anode compartment.

What is claimed is:

1. Process for the production of electric current using an electrochemical generator comprising at least one cell with at least one anode compartment in which there is present, during the production of electric current, a aqueous electrolyte in movement, called primary electrolyte, containing particles formed, at least in part, of an active metallic material, called active particles, said active metallic material being capable of being oxidized electrochemically in the anode compartment with the loss of the electrons collected by at least one anodic electron collector, characterized by the fact that during the production of electric current substantially the entire surface of the anodic electron collector arranged on the primary electrolyte side is formed of a metallic material which is in passivated state, and by the fact that, prior to the production of electric current, said surface is placed in contact with an aqueous electrolyte, called secondary electrolyte, said surface being then brought to a potential less than the equilibrium potential $V_a$ of the electrochemical reaction of the reduction of the water contained in said secondary electrolyte, said reduction reaction liberating hydrogen.

2. Process according to claim 1, characterized by the fact that prior to the production of electric current, the surface of the anodic electron collector is covered with a carpet of active particles sedimented in the secondary electrolyte, said carpet and the secondary electrolyte being immovable.

3. Process according to claim 1, characterized by the fact that prior to the production of electric current, the secondary electrolyte containing active particles is caused to flow within the anode compartment.

4. Process according to claim 1, characterized by the fact that prior to the production of electric current, the anodic electron collector is connected electrically by at least one electron-conducting conductor to at least one part, at least a portion of which is metallic, said metallic portion which is in electrical connection with the anodic electron collector being of an active metallic material or in contact with an active metallic material, said metallic portion, and possibly the active metallic material with which it is in contact, being in contact with a coupling electrolyte, which in its turn is in ionic contact with the secondary electrolyte.

5. Process according to claim 1, characterized by the fact that prior to the production of electric current a potential less than the equilibrium potential $V_a$ is imposed upon the anodic electron collector by at least one device which supplies an electric voltage.

6. Process according to claim 1, characterized by the fact that the anodic electron collector is in contact with the secondary electrolyte and is brought to a potential less than the equilibrium potential $V_a$ during substantially the entire quiescent period of the electrochemical generator.

7. Process according to claim 1, characterized by the fact that the secondary electrolyte is formed of the primary electrolyte or is of the same nature as the primary electrolyte.

8. Process according to claim 1, characterized by the fact that the active particles in the moving primary or secondary electrolyte form a sedimentation bed contiguous to the lower face of the inside of the anode compartment and entrained by the electrolyte, said lower face being formed at least in part by all or part of the surface of the anodic electron collector.

9. Process according to claim 1, characterized by the fact that the metallic material of the surface of the anodic electron collector is formed of or comprises at least one of the following metals: magnesium, scandium, yttrium, lanthanum, titanium, zirconium, hafnium, niobium, tantalum, chromium.

10. Process according to claim 9, characterized by the fact that the metallic material of the surface of the anodic electron collector is an austenitic stainless steel comprising at least iron, nickel and chromium, said steel being thermodynamically stable at the temperature of use of the electrochemical generator and comprising at the most 0.02% carbon.

11. Process according to claim 1, characterized by the fact that the active metallic material is zinc, the primary electrolyte is an alkaline electrolyte, and the cell comprises at least one cathode whose active material is oxygen or at least a compound of oxygen.

12. Electrochemical generator of electric current comprising at least one cell with at least one anode compartment comprising at least one inlet and one outlet, said compartment being connected, on the one hand, via its inlet to a feed device and, on the other hand, via its outlet to an evacuation device, said devices making it possible to create, through the compartment during the production of electric current, a flow of an aqueous electrolyte, called primary electrolyte, containing particles formed, at least in part, of an active metallic material, called active particles, said active metallic material being capable of being oxidized electrochemically in the anode compartment with the loss of the electrons collected by at least one anodic electron collector, characterized by the fact that during the production of electric current substantially the entire surface of the anodic electron collector arranged on the primary electrolyte side is formed of a metallic material which is in passivated state, and by the fact that, prior to the production of electric current, said surface is in contact with an aqueous electrolyte, called secondary electrolyte, the generator having means which make it possible then to bring said surface to a potential less than the equilibrium potential $V_a$ of the electrochemical reaction of the reduction of the water contained in said secondary electrolyte, said reduction reaction liberating hydrogen.

13. Electrochemical generator according to claim 12, characterized by the fact that prior to the production of electric current, the surface of the anodic electron collector is covered with a carpet of active particles sedimented in the secondary electrolyte, said carpet and the secondary electrolyte being immovable.

14. Electrochemical generator according to claim 12, characterized by the fact that the feed device and the evacuation device make it possible to create, within the anode compartment, a flow of the secondary electrolyte containing active particles prior to the production of electric current.

15. Electrochemical generator according to claim 12, characterized by the fact that prior to the production of electric current, the anodic electron collector is connected electrically by at least one electron-conducting conductor to at least one part, at least a portion of which is metallic, said metallic portion which is in electrical connection with the anodic electron collector being of an active metallic material or in contact with an active metallic material, said metallic portion, and possibly the active metallic material with which it is in contact, being in contact with a coupling electrolyte, which in its turn is in ionic contact with the secondary electrolyte.

16. Electrochemical generator according to claim 12, characterized by the fact that it comprises at least one device supplying an electric voltage which makes it possible to bring the anodic electron collector to a potential less than the equilibrium potential $V_a$ prior to the production of electric current.

17. Electrochemical generator according to claim 12, characterized by the fact that the anodic electron collector is in contact with the secondary electrolyte and is at a potential less than the equilibrium potential $V_a$ during substantially the entire quiescent period of the electrochemical generator.

18. Electrochemical generator according to claim 12, characterized by the fact that the secondary electrolyte is formed of the primary electrolyte or is of the same nature as the primary electrolyte.

19. Electrochemical generator according to claim 12, characterized by the fact that the active particles in the moving primary or secondary electrolyte constitute a sedimentation bed contiguous to the lower face of the inside of the anode compartment and entrained by the electrolyte, said lower face being formed at least in part by all or part of the surface of the anodic electron collector.

20. Electrochemical generator according to claim 12, characterized by the fact that the metallic material of the surface of the anodic electron collector is formed of or comprises at least one of the following metals: magnesium, scandium, yttrium, lanthanum, titanium, zirconium, hafnium, niobium, tantalum, chromium.

21. Electrochemical generator according to claim 20, characterized by the fact that the metallic material of the surface of the anodic electron collector is an austenitic stainless steel comprising at least iron, nickel, and chromium, said steel being thermodynamically stable at the temperature of use of the electrochemical generator and comprising at the most 0.02% carbon.

22. Electrochemical generator according to claim 12, characterized by the fact that the active metallic material is zinc, the primary electrolyte is an alkaline electrolyte, and the cell comprises at least one cathode whose active material is oxygen or at least a compound of oxygen.

23. Electrochemical generator according to claim 12, characterized by the fact that it comprises at least one cathode compartment and by the fact that the flow of the primary electrolyte containing the active particles takes place between the cathode compartment and the anodic electron collector, said anodic electron collector being impermeable to the primary electrolyte and to the active particles.

* * * * *